US012754734B2

(12) United States Patent
Shivanna et al.

(10) Patent No.: US 12,754,734 B2
(45) Date of Patent: Oct. 6, 2026

(54) PROGRAM COMPONENTS REGISTRATION USING PROJECT METADATA

(71) Applicant: HEWLETT PACKARD ENTERPRISE DEVELOPMENT LP, Spring, TX (US)

(72) Inventors: Suhas Shivanna, Houston, TX (US); Anoop Chandra Bidugalu Nagesh, Houston, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 315 days.

(21) Appl. No.: 18/671,517

(22) Filed: May 22, 2024

(65) Prior Publication Data

US 2025/0362903 A1 Nov. 27, 2025

(51) Int. Cl.

| | |
|---|---|
| ***G06F 8/71*** | (2018.01) |
| ***G06F 8/36*** | (2018.01) |
| ***G06F 8/41*** | (2018.01) |
| ***G06Q 10/0875*** | (2023.01) |

(52) U.S. Cl.

CPC .................. *G06F 8/71* (2013.01); *G06F 8/36* (2013.01); *G06F 8/427* (2013.01); *G06Q 10/0875* (2013.01)

(58) Field of Classification Search

CPC ............... G06F 8/71; G06F 8/36; G06F 8/427
USPC .................................................. 717/120–140
See application file for complete search history.

(56) References Cited

U.S. PATENT DOCUMENTS

| | | | | |
|---|---|---|---|---|
| 8,234,620 | B1 * | 7/2012 | Bychkov | G06F 8/00 717/103 |
| 8,464,205 | B2 * | 6/2013 | Chaar | G06F 8/20 717/121 |
| 10,671,384 | B1 * | 6/2020 | Boynes | G06F 9/44526 |
| 10,831,944 | B1 * | 11/2020 | Giattina | G06F 30/13 |
| 11,321,791 | B1 * | 5/2022 | Krause | G06Q 10/06312 |
| 11,474,796 | B1 * | 10/2022 | Mather | G06F 8/77 |
| 11,651,079 | B2 * | 5/2023 | Atighetchi | G06F 8/10 726/1 |
| 11,836,487 | B2 * | 12/2023 | Sturtevant | G06F 8/77 |
| 2017/0147338 | A1 | 5/2017 | Jackson et al. | |

OTHER PUBLICATIONS

Liu et al, "UniProxy: Breaking the Per-Flow Barrier in Multipath Proxy Design", ACM, pp. 1-20 (Year: 2026).*

(Continued)

*Primary Examiner* — Anil Khatri
(74) *Attorney, Agent, or Firm* — Trop, Pruner & Hu, P.C.

(57) ABSTRACT

In some examples, a system receives, at a proxy, build command information from a build tool. Based on the build command information, the proxy obtains program components from one or more program repositories for building a deliverable with the build tool. The proxy associates project metadata with the build command information, the project metadata relating to a project associated with building the deliverable comprising the program components. The proxy initiates a registration of the program components with the project metadata in a provenance repository. The system generates, using the provenance repository, component information identifying the program components that are part of the deliverable.

20 Claims, 4 Drawing Sheets

(56) References Cited

OTHER PUBLICATIONS

Vlaanderen, et al, "Model-Driven Assessment in Software Product Management", IEEE, pp. 1-9 (Year: 2010).*
Georgiou et al, "Software Development Lifecycle for Energy Efficiency: Techniques and Tools", ACM, pp. 1-33 (Year: 2019).*
Jfrog Ltd.; "8 Reasons for DevOps to use a Binary Repository Manager"; Mar. 2024; 19 pages.
JFROG, JFROG Help Center, JFrog Artifactory Documentation downloaded Apr. 24, 2024 (4 pages).
NTIA, The Minimum Elements For a Software Bill of Materials (SBOM), Jul. 12, 2021 (28 pages).
NVD—Official Common Platform Enumeration (CPE) Dictionary downloaded May 6, 2024 (2 pages).
Opensource.com, What is open source? downloaded Apr. 24, 2024 (6 pages).
SLSA, Provenance downloaded May 8, 2024 (16 pages).
Sonatype Inc; "Proxy Repository Concepts"; Nov. 22, 2023; 2 pages.
Wikipedia, Common Platform Enumeration downloaded May 6, 2024 (3 pages).
Wikipedia, Open-source software downloaded Apr. 24, 2024 (14 pages).
Yalo, M.; "CI/CD Integration"; Dec. 29, 2019; 4 pages.

* cited by examiner

PROGRAM COMPONENTS REGISTRATION USING PROJECT METADATA

BACKGROUND

Deliverables can be built using program components from various different sources. A "deliverable" can refer to a product (including a program such as software or firmware formed of machine-readable instructions) or a service (such as a web service, a cloud service, or another type of service). The program components may include open-source program components that are available to a wide audience. The program components may also be provided by specific vendors.

BRIEF DESCRIPTION OF THE DRAWINGS

Some implementations of the present disclosure are described with respect to the following figures.

Figure 1:
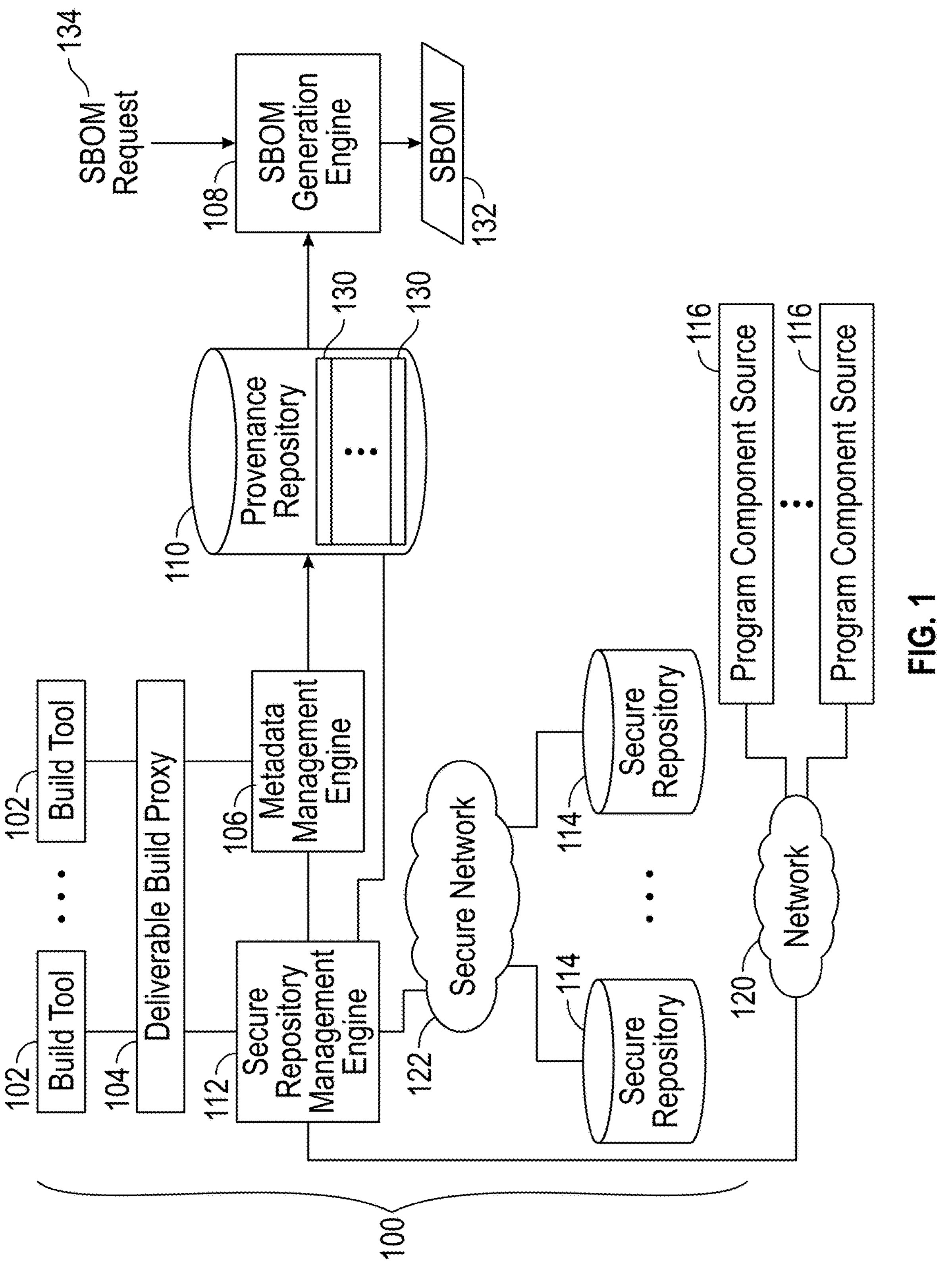
FIG. 1 is a block diagram of an arrangement that includes build tools, a proxy, a metadata management system, Software Bill of Materials (SBOM) generation and attestation service, care repositories, and program component sources, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Deliverables built by an enterprise using program components from a variety of sources, including open-source program components and program components from specific third-party vendors, may be subjected to supply chain attacks. A supply chain attack may seek to tamper with a program component used for building a deliverable, such that the deliverable becomes compromised. Increasingly, industry standards, government regulations, or internal enterprise rules may specify compliance requirements that seek to improve supply chain security. However, it can be challenging to satisfy the compliance requirements when building deliverables that include program components from different sources. A large enterprise, which may have developers at distributed geographic locations throughout a country or the world, may have a large number of projects that are actively developing respective deliverables using program components from a wide variety of sources.

The management of program components for building deliverables may vary across different development teams of the enterprise. For example, a development team may use an artifactory (such as a JFrog Artifactory or Nexus Artifactory) that stores and manages artifacts, binaries, packages, library files, and images that are to be used for building deliverables. Another development team may integrate program components into a build system used by the development team, such that the program components are available when using the build system to build a deliverable. Additionally, some developers may download some program components directly from public sources without evaluating the potential implications and risks of supply chain attacks. The lack of consistency among different development teams of the enterprise can subject some deliverables developed by the enterprise to supply chain attacks. Additionally, it can be challenging to establish a supply chain provenance and generate an accurate Software Bill of Materials (SBOM) for program components in respective deliverables developed by the enterprise. As a result, it can be challenging to satisfy compliance requirements that relate to supply chain security.

In accordance with some implementations of the present disclosure, a program component management system is able to automate registration of program components of a deliverable developed by an enterprise in a provenance repository, where the registration associates, in the provenance repository, the program components of the deliverable with project metadata. The project metadata contains information associated with a project for building the deliverable. For example, the project metadata can include a project identifier that uniquely identifies the deliverable developed by the enterprise as well as other information. Each entry of the provenance repository associates a project with a collection of program components used to build a deliverable. Multiple respective entries of the provenance repository associate different projects with respective different collections of program components for different deliverables. The program component management system includes a proxy that receives build command information from a build tool used to build the deliverable, and associates project metadata with the build command information. The build command information can include one or more build commands for building a deliverable including program components. The build command information can also include input parameters to be used by the build command (s).

A "proxy" can refer to an interface program provided between different components, including between a build tool and a metadata management engine used for registering program components with project metadata in a provenance repository, and a program repository that stores program components that can be retrieved for building a deliverable. The proxy can perform designated functionalities such as initiating the registration in the provenance repository and downloading program components from the program repository.

For example, the build tool can send a proxy command to the proxy, where the proxy command includes the build command information and the project metadata. The proxy command abstracts (wraps) the build command(s) that the build tool is to invoke. The proxy uses the project metadata associated with the build command information to initiate the registration of program components with project metadata in the provenance repository. The provenance repository can be accessed to generate component information that identifies program components that are part of the deliverable. An example of the component information that can be generated includes a SBOM containing the dependent program components of the deliverable. In addition to registering the project metadata with the dependent program components in the provenance repository, the proxy can also issue the build command to securely obtain the program components for building the deliverable.

A "program component' can refer to any module with machine-readable instructions that can be separately retrievable for inclusion in a deliverable. Examples of program components include operating system (OS) images, cryptographic modules that apply cryptographic operations, web server programs, JavaScript modules, Python modules, and so forth.

A SBOM identifies dependent program components for a deliverable. A "dependent" program component refers to a program component that the deliverable uses as part of the deliverable's operation. Examples of fields in a SBOM include any or some combination of the following: a supplier name that identifies a supplier of a program component, a name of a program component, a version of a program component, group information that can identify related program components that are part of a group, an author of the SBOM, a timestamp indicating when a program component was created or modified, a tag or other information identifying a deliverable that the program component is part of, or other information. Examples of fields included in a SBOM are described in The United States Department of Commerce, entitled "The Minimum Elements for a Software Bill of Materials." In other examples, a SBOM can include other information.

In other examples, a build tool is a legacy build tool that is not configured to interact with the proxy. As a result, the build tool is unable to send a proxy command to the proxy. In such examples, the proxy is able to parse build information of the build tool to determine the build command information for a deliverable to be built by the build tool. The proxy can retrieve project metadata to associate with the build command information, and register the project metadata with respective program components in a provenance repository.

Using techniques or mechanisms according to some examples of the present disclosure, improvements in the deliverable building technology can be achieved by using a proxy-based program component management system that is able to register program components with project metadata such that component information that identifies program components of a deliverable are readily available to ensure supply chain security. Improvements in computer functionality can be achieved by checking to ensure that program components included in a deliverable are from authorized sources so that a deliverable built using the program components would not cause failures or perform unauthorized actions that may imperil the integrity of a computing environment.

FIG. 1 is a block diagram of an example arrangement that includes build tools 102, a deliverable build proxy 104, a metadata management engine 106, a SBOM generation engine 108, a provenance repository 110, a secure repository management engine 112, secure repositories 114, and program component sources 116, in accordance with some examples of the present disclosure.

The build tools 102, the deliverable build proxy 104, the metadata management engine 106, the SBOM generation engine 108, the provenance repository 110, the secure repository management engine 112, and the secure repositories 114 are part of a secure environment 100 that is protected against unauthorized access by entities (e.g., users, programs, or machines) that are not authorized to access elements in the secure environment 100. The secure environment 100 can be part of a trust domain of an enterprise (or multiple enterprises). An "enterprise" can refer to a business organization, a government agency, an educational organization, an individual, or another entity.

A "build tool" can refer to any system that can be used by developers to produce a deliverable, such as a software product, a firmware product, a service, or any other type of deliverable. A build tool can automate the creation of a deliverable using one or more program components. In some examples, a build tool includes a build script that uses build information to obtain program components to add to a deliverable. Examples of the build information include one or more build files, such as Makefiles. In other examples, a build tool includes a continuous integration/continuous delivery (CI/CD) server that aids a developer (or development team) in automatically and frequently integrating program components (as well as updated program components) into a deliverable.

A repository refers to a storage subsystem implemented using one or more storage devices. Examples of storage devices include disk-based storage devices, solid state drives, or other types of storage devices.

The deliverable build proxy 104 can be implemented using machine-readable instructions executable on one or more hardware processing circuits. In some examples, multiple deliverable build proxies may be implemented. For example, different deliverable build proxies may be provided for use with different types of build commands. An example of a build command is an npm-build command for installing packages. A first build tool 102 can support the use of package manager commands such as npm-install commands that are used to install packages of software components. This first build tool 102 can interact with a first deliverable build proxy 104 according to some examples of the present disclosure. Other examples of build commands can include any or some combination of the following: build commands according to the Secure Shell (SSH) File Transfer Protocol (SFTP), a pip package installer for Python deliverables, or other types of build commands. Different deliverable build proxies 104 can support build tools 102 that issue different types of build commands.

Each build tool 102 may be associated with build information, such as a build file (e.g., a Makefile). The build information can be in the form of a script, for example. More generally, the build information can include information that refers to dependent program components of a deliverable. The build information can include instructions on how to build the deliverable. The build information may also include project metadata for a project associated with the deliverable. In accordance with some examples of the present disclosure, the build information of a build tool 102 refers to use of a deliverable build proxy (e.g., 104) for downloading program components for the deliverable from secure repositories 114. As a result, the build tool 102 would not download the program components for the deliverable directly from the secure repositories 114; instead, the build tool 102 would issue a build command to the deliverable build proxy indicated in the build information.

Secure Repositories

Each secure repository 114 stores program components obtained from program component sources 116 over a network 120. Although depicted as a singular network, it is noted that the network 120 can include multiple networks, such as a public network (e.g., the Internet), a local area network (LAN), or another type of network.

A program component source 116 can refer to any system from which one or more program components can be obtained. For example, a program component source 116 can include an open-source software (OSS) system in which open-source program components are available. As another example, a program component source 116 includes a vendor system provided by a vendor of program components, where the vendor system (e.g., a server) is accessible to obtain program components provided by the vendor. Some program component sources 116 may be accessible over a public network, such as the Internet. Other program component sources 116 can be accessible over more secure networks, such as LANs or management networks.

The secure repository management engine 112 manages the retrieval of program components from the program component sources 116 over the network 120 to the secure repositories 114. The secure repository management engine 112 can be provided with information identifying program component sources 116 from which the secure repository management engine 112 is to retrieve and upload program components to the secure repositories. Such identified program component sources 116 are trusted program component sources 116.

The secure repositories 114 are accessible over a secure network 122, such as a LAN or other network in the secure environment 100. In some examples, a secure repository 114 can be built using an artifactory, such as an open-source JFROG or Nexus Artifactory. In other examples, a secure repository 114 can be built using a proprietary technology.

To provide security, network security controls (or access controls) can be implemented to control access to the secure repositories 114. For example, the secure repository management engine 112 can include a firewall to provide the network security controls. The firewall controls inbound access to a secure repository 114 from clients by checking whether the clients are authorized. A build tool 102 can be an authorized client of one or more secure repositories 114. A client can be authorized based on a network address (e.g. an Internet Protocol (IP) address or a Media Access Control (MAC) address) of the client. For example, IP addresses assigned to the build tools 102 can be treated as trusted IP addresses. An access from an unauthorized client may be blocked by the firewall in the secure repository management engine 112. In other examples, the secure repository management engine 112 can base access of a secure repository 114 using a credential (e.g., a username and password, biometric information of a user, a certificate, etc.) presented by a client.

In some examples, a collection of secure repositories 114 can be a central collection of secure repositories that is accessible by different development teams of an enterprise. A "collection" of secure repositories can include a single secure repository or multiple secure repositories. The central collection of secure repositories 114 is shared across development teams of the enterprise. Different secure repositories of the collection of secure repositories 114 may store different types of program components.

In other examples, the secure repositories 114 can include federated collections of secure repositories, where any given collection of secure repositories 114 can be replicated to form multiple instances (copies) of the collection of secure repositories 114. For example, different development teams can access their instance of the given collection of secure repositories 114.

The replication of collections of secure repositories 114 can be managed by the secure repository management engine 112. Additionally, the secure repository management engine 112 can perform synchronization of multiple instances of a given collection of secure repositories, by synchronizing any changes in a first instance of the given collection of secure repositories with one or more other instances of the given collection of secure repositories.

In some examples, the secure repository management engine 112 can implement a scraping technique that will periodically download, from respective program component sources 116, common program components used across an enterprise, such as by different development teams that are building different deliverables. Examples of such common program components can include any or some combination of the following: OS images (e.g., Linux OS images or images of other types of OSes), cryptographic modules that apply cryptographic operations, web server programs, and so forth. Once the common program components are retrieved into the secure repositories 114, the common program components would not have to be re-retrieved at a later time, unless updated.

In some examples, the secure repository management engine 112 can implement policy-based program component onboarding according to one or more policies. A policy may identify locations (e.g., Uniform Resource Locators (URLs)) of program component sources 116. The policy may also specify when or under what conditions the secure repository management engine 112 is to check the program component sources 116 to determine if any further program components are to be retrieved.

A validation policy can specify a validation requirement for program components when retrieved from a program component source 116 into a secure repository 114. Examples of validations that can be performed on a program component when retrieved into a secure repository 114 from a program component source 116 can include any or some combination of the following: malware scanning to detect if the program component contains any malware, an integrity check of the program component to ensure that the program component has not been tampered with or otherwise modified, or other validation checks. An integrity check can include computing a checksum or another value based on content of the program component, and comparing the computed checksum or another computed value against a predetermined checksum or other value.

Validation can also be based on various validation criteria to verify trust and security of the program component, such as any or some combination of the following: a quantity of committers (where a committer refers to an entity that has committed changes to the program component), a quantity of code releases of the program component, a location of a program component source (e.g., as represented by a URL), end-of-life (EOL) status of the program component, a reputation of the program component source (e.g., based on the reputation of a community that has contributed to an OSS program component, the reputation of a vendor that provided the program component, etc.), or other criteria.

In some examples, a larger quantity (e.g., greater than a committer quantity threshold) of committers can indicate that the program component can be trusted, while a lower quantity (e.g., less than the committer quantity threshold) of committers can indicate that the program component should not be automatically trusted. Further, a larger quantity (e.g., greater than a release quantity threshold) of code releases of the program component can indicate that the program component can be trusted, while a lower quantity (e.g., less than the release quantity threshold) can indicate that the program component should not be automatically trusted.

In further examples, information identifying trusted locations (e.g., trusted URLs, trusted countries, etc.) of program components can be used by the secure repository management engine 112 to determine whether a program component from a given location can be trusted. Alternatively, information can identify untrusted locations (e.g., untrusted URLs, untrusted countries, etc.). A program component from an untrusted location would not be trusted by the secure repository management engine 112 and thus would not be added to any secure repository 114.

An EOL status of a program component identifies whether the program component is at end of life. If the program component is indicated as being past end of life, the secure repository management engine 112 would not retrieve the program component into any secure repository 114. The secure repository management engine 112 will allow the retrieval of a program component from a program component source 116 to a secure repository 114 if the EOL status identifies the program component as not being end of life.

The reputation of a program component source can be based on an assigned reputation score, which can have one of multiple values (e.g., low, medium, high, or a numerical score). The secure repository management engine 112 will retrieve a program component from a program component source 116 having a reputation score greater than a reputation threshold. However, the secure repository management engine 112 will not retrieve a program component from a program component source 116 having a reputation score less than the reputation threshold.

In other examples, instead of performing automated policy-based onboarding of program components, a manual onboarding of program components from program component sources 116 into the secure repositories 114 can be performed by one or more administrators or other users, assuming such administrator(s) or other user(s) have the requisite permissions. A user can securely download a program component from a program component source 116 and store the program component into one or more secure repositories 114.

Build Tools/Deliverable Build Proxy

The deliverable build proxy 104 provides an interface between the build tools 102 and the following two components: the metadata management engine 106 and the secure repositories 114. Although reference is made to one deliverable build proxy 104 in the ensuing discussion, note that multiple deliverable build proxies 104 may be deployed as discussed further above.

Traditionally, build commands issued by a build tool to download program components for a deliverable do not identify the project. For example, an enterprise can have a relatively large number of projects that are associated with producing various different deliverables. These projects may be associated with different development teams, who may use build tools for creating respective deliverables.

In accordance with some examples of the present disclosure, a build tool 102 may be configured to provide project metadata along with a build command information to retrieve component program components from one or more secure repositories 114. The build command information can include one or more build commands, along with associated input parameters.

As an example, instead of sending an npm command to download program components such as JavaScript modules, the build tool 102 may send a proxy command, such as a "secure_npm_proxy" command. The secure_npm_proxy command abstracts (wraps) the npm command by providing the npm command functionality as well as use the project metadata passed as input parameters to support the registration of the program components with the provenance repository 110 using the metadata management engine 106.

The project metadata can include a project identifier to identify a deliverable to which the program components are to be added. "Adding" a program component to a deliverable refers to associating the program component with the deliverable such that the deliverable is able to invoke the program component during an operation of the deliverable. The project identifier can include a name of a project, or any string or symbol that can uniquely identify a deliverable. The project metadata can also include other information, such as a list of program components that is the subject of the download command. Alternatively, the list of program components may be obtained as part of build command execution. The project metadata may further include additional information for fields to be included in a SBOM for the deliverable (as noted further above). The project metadata may be input by developers of a development team as input parameters in a configuration file to the build tool 102.

In response to a proxy command, the deliverable build proxy 104 can perform the following: register program components with project metadata in the provenance repository 110, and invoke the build command(s) in the proxy command to download the project components from one or more secure repositories 114.

The deliverable build proxy 104 accesses the metadata management engine 106 to register, in an entry 130 of the provenance repository 110, the project metadata with the respective collection of program components associated with the proxy command. More specifically, the entry 130 can include provenance information for the deliverable to be built by the build command(s) in the proxy command, where the provenance information can include the project metadata (or a portion of the project metadata) and information of the program components (e.g., identifiers of the program components). In some examples, the deliverable build proxy 104 is able to access the metadata management engine 106 over a communication link, such as an inter-process link (IPL), an API, or any other type of link. In other examples, the metadata management engine 106 and the deliverable build proxy 104 can be integrated together as part of the same module.

In examples where the provenance repository 110 is implemented as a database, the metadata management engine 106 can issue database queries, such as Structured Query Language (SQL) queries, to write data to respective entries 130 of the provenance repository 110. In other examples, the provenance repository 110 can store data in other formats. In further examples, an interface such as an API or a command line interface (CLI) can be used by the metadata management engine 106 to update the provenance repository 110.

The metadata management engine 106 allows various development teams for different projects and who may use different build tools 102 to easily register program components of respective deliverables with project metadata in the provenance repository 110. In some examples, authentication can be performed by the metadata management engine 106 to check whether clients (including the build tools 102) have the requisite permission to access (including update) the provenance repository 110. For example, the authentication can include a token-based authentication, where the token can include any or some combination of the following: an authentication key such as an API key or JavaScript Object Notation (JSON) web token (JWT) key, an identifier such as a name of a deliverable that is being built, a version of the deliverable, or other information.

As noted above, provenance information in an entry 130 of the provenance repository 110 can include project metadata (or a portion of the project metadata) and information of the program components for a deliverable. In addition, the provenance information may also include any or some combination of the following: location information (e.g., a URL) of a program component source, a cryptographic hash value derived based on a program component, a time of download of a program component, a version of a program component, any dependencies of a program component to other program component(s), or other information. Further, provenance information in the entry 130 of the provenance repository 110 can include information of fields for a SBOM.

In addition, validation results for program components of the deliverable may be in provenance information registered in the entry 130 of the provenance repository 110. The validation results include information of validations performed of the program components, including, for example, performing malware scanning of a program component, performing an integrity check of a program component, or performing another validation check of a program component. The validation results can also be considered part of the project metadata registered with the collection of program components for the deliverable.

In some examples, the secure repository management engine 112 can store the validation results in the provenance repository 110 and/or in the secure repositories 114. If the validation results are already in the provenance repository 110, then the metadata management engine 106 would not have to retrieve the validation results during registration. However, if the validation results are not already in the provenance repository 110, then the metadata management engine 106 may interact with the secure repository management engine 112 to obtain the validation results to add to the provenance repository 110.

In further examples, audit information may be added to entries 130 of the provenance repository 110. The audit information may either be part of the provenance information included in the entries 130, or alternatively, the audit information can be stored separately from the entries 130, either in the provenance repository 110 or in a separate audit repository. The audit information can include information of certain events associated with building a deliverable by a build tool. 102. The events in the audit information can include any or some combination of the following: an event associated with creation or update of a policy for onboarding program components, an event associated with an anomaly detected during onboarding of program components or downloading of program components from secure repositories 114, or other events.

SBOM Generation

In some examples, the SBOM generation engine 108 can create a SBOM 132 in response to a SBOM request 134 to generate a SBOM. The SBOM request 134 may be received from a requesting entity, such as a user, a program, or a machine. The SBOM generation engine 108 generates the SBOM 132 using the data stored in the provenance repository 110. The SBOM request 134 can include project metadata associated with a target deliverable for which the SBOM 132 is to be generated. Such project metadata can include any or some combination of the following: a project identifier, a deliverable version, or other information that can indicate which deliverable is the subject of the SBOM request 134.

Using the information in the SBOM request 134, the SBOM generation engine 108 can perform a lookup by retrieving one or more entries 130 from the provenance repository 110 that contain data relevant for the target deliverable. The lookup can be a database lookup using database queries, or a lookup using an API or CLI of the provenance repository 110. For example, each entry 130 of the provenance repository 110 can contain a project identifier and information of program components associated with a deliverable indicated by the project identifier. The information of the program components in a retrieved entry 130 of the provenance repository 110 can be added by the SBOM generation engine 108 to the SBOM 132.

In some examples, generation of a SBOM can be accomplished by the SBOM generation engine 108 without using an analysis tool, such as a Software Composition Analysis (SCA) tool, that is used to scan program code (e.g., source code and/or binary code) of a deliverable to discover the program components of the deliverable, for the purpose of generating a SBOM. Such an analysis tool can be costly and is designed with a specific capability that may not be accurate in different scenarios associated with different build tools, different programming languages, and so forth. An analysis tool may produce false positives and false negatives, which may make the output produced by the analysis tool not fully reliable and accurate.

A false negative refers to failing to indicate the presence of a program component that is actually in a deliverable. In an example, an analysis tool may rely on detecting signatures of program components in program code of a deliverable for determining whether the program components are present in a deliverable. A signature can include a hash value or another value based on content of a program component. The analysis tool uses a signature database of predefined signatures of known program components. If the signature of a particular program component is not present in the signature database, the analysis tool would not recognize the signature in the program code of the deliverable and thus would not indicate the presence of the particular program component in a generated SBOM for the deliverable. This results in a false negative.

A false positive refers to indicating the presence of a given program component in a deliverable when the deliverable does not include the given program component. In an example, a false positive can occur if an analysis scans program code of a deliverable for certain patterns in code snippets. When the analysis tool detects a specific pattern in a code snippet, the analysis tool may indicate presence of the given program component in the deliverable based on comparing the specific pattern to patterns in a pattern database. However, patterns of program components may change over time and the pattern database may not accurately reflect all possible changes. Thus, a detected pattern in the program code of the deliverable may match a pattern for the given program component that is actually not in the deliverable. A SBOM generated based on this incorrect match will include a false positive that incorrectly indicates the presence of the given program component in the deliverable.

Because an analysis tool may produce inaccurate results including false positives and/or false negatives, an entity that generates a SBOM based on the output of the analysis tool may not attest with high confidence the accuracy of the SBOM.

In accordance with some examples, since SBOM generation is based on the provenance repository 110 that is populated with information by the metadata management engine 106 during the building of deliverables by build tools 102, the likelihood of false positives and false negatives in a SBOM based on the provenance repository 110 is reduced or eliminated. The provenance repository 110 correlates project metadata (e.g., project identifiers) to program components for different deliverables. Since a SBOM request (e.g., 134) that requests the generation of a SBOM for a target deliverable includes the project metadata for the target deliverable, the entry 130 (or entries 130) retrieved from the provenance repository 110 based on the SBOM request will likely contain accurate information related to the program components for the target deliverable. As a result, the entity that requested the generation of the SBOM for the target deliverable can attest with high confidence the accuracy of the SBOM. The generation of accurate SBOMs can aid in supply chain security according to industry standards, government regulations, or internal enterprise rules.

In addition to generation of accurate SBOMs, other security measures to enhance supply chain security according to some examples of the present disclosure include validating program components downloaded from program component sources 116 to ensure the program components are trusted, secure, and have not been compromised. A further security measure includes performing access control of the secure repositories 114.

Although some examples allow SBOM generation to be performed without using SCA tools that scan program code of deliverables, in other examples, the SBOM generation engine 108 can use the information in the provenance repository 110 to augment information from an SCA analysis tool. For example, the information in the provenance repository 110 for a given deliverable can be merged with information in the output of the analysis tool that scanned the program code of the given deliverable. Any inconsistencies between the information in the provenance repository 110 and the output of the analysis tool can be reconciled (e.g., missing information in the output of the analysis tool can be augmented with the information in the provenance repository 110, or false positives in the output of the analysis tool can be removed).

Figure 2:
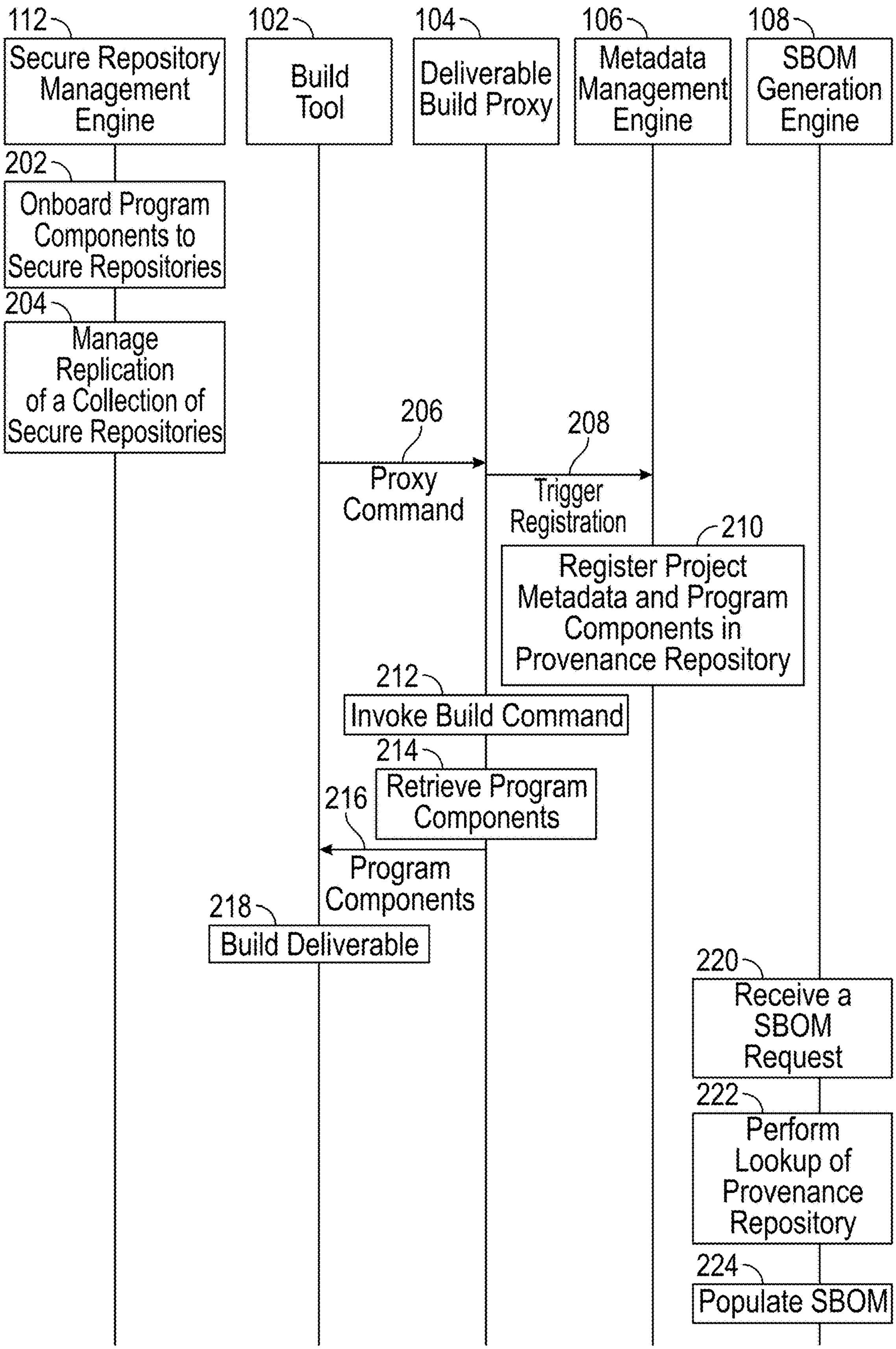
FIG. 2 is a flow diagram of a process according to some examples.

The following refers to both FIG. 1 and FIG. 2. FIG. 2 is a flow diagram of a process of populating a provenance repository (e.g., 110 in FIG. 1) and generating a SBOM using the provenance repository, in accordance with some examples of the present disclosure. Although FIG. 1 shows a specific order of tasks, in other examples, the tasks can be performed in a different order, some tasks may be omitted, and additional tasks added.

The secure repository management engine 112 onboards (at 202) program components from the program component sources 116 over the network 120 to the secure repositories 114. The retrieval of the program components can be performed based on requests from entities (e.g., users, programs, or machines), according to a schedule, or on a periodic basis. As discussed further above, the onboarding can include a policy-based onboarding process, which can include validating program components as the program components are onboarded into the secure repositories 114.

In some examples, the secure repository management engine 112 can also manage (at 204) replication of a collection of secure repositories 114. For example, a system administrator can configure the secure repository management engine 112 to replicate the collection of secure repositories 114 for use by different development teams. The management of replicated instances of the collection of secure repositories 114 can also include synchronizing content of the replicated instances of the collection of secure repositories 114.

In other examples, replication of collections of secure repositories 114 is not performed; instead, a central collection of secure repositories 114 can be shared by multiple development teams.

To build a deliverable, a build tool 102 can issue (at 206) a proxy command to the deliverable build proxy 104. The proxy command abstracts a build command by wrapping the build command with project metadata. The build command is issued for building a deliverable by adding program components into the deliverable. In response to the proxy command, the deliverable build proxy 104 triggers (at 208), by interacting with the metadata management engine 106, a registration of the project metadata with the program components. The metadata management engine 106 registers (at 210) the project metadata and the program components associated with the build command into an entry 130 of the provenance repository 110.

Additionally, in response to the proxy command, the deliverable build proxy 104 invokes (at 212) the build command. Invoking the build command results in triggering a build process that interacts with the secure repository management engine 112 to retrieve (at 214) the program components for the deliverable from one or more secure repositories 114. The retrieved program components are provided (at 216) by the build process to the build tool 102, which builds (at 218) the deliverable using the retrieved program components.

After the deliverable is built, the SBOM generation engine 108 may receive (at 220), from a requester, a SBOM request (e.g., 134 in FIG. 1) to generate a SBOM. The SBOM request includes project metadata that includes a project identifier that identifies the deliverable for which the SBOM is to be generated. In response to the SBOM request, the SBOM generation engine 108 performs (at 222) a lookup of the provenance repository 110 to retrieve one or more entries 130 containing the project metadata. The SBOM generation engine 108 extracts information of the project components from the retrieved one or more entries 130, and populates (at 224) the SBOM with the information of the project components. The populated SBOM is then sent to the requester of the SBOM.

The following refers to examples associated with build deliverables and generating SBOMs for such deliverables. A first project may build a C or C++ deliverable, which can include an Open Secure Socket Layer (OpenSSL) library and an Apache web server as dependent program components. A first build tool 102 can use the SFTP (SSH File Transfer Protocol) to download the C or C++ program component. A proxy associated with the first build tool 102 can be referred to as an SFTP proxy, which is an example of the deliverable build proxy 104 of FIG. 1. The SFTP proxy can trigger the registration of proxy metadata for the C or C++ deliverable with the dependent program components of the C or C++ deliverable in the provenance repository 110. The SFTP proxy also invokes an SFTP command to download the dependent program components from one or more secure repositories 114.

A second project may build a JavaScript module (another example of a deliverable), which may depend on various npm components. A second build tool 102 can use npm commands to download the JavaScript module. A proxy associated with the second build tool 102 can be referred to as an npm proxy, which is an example of the deliverable build proxy 104 of FIG. 1. The npm proxy can trigger the registration of proxy metadata for the JavaScript module with the npm components of the JavaScript module in the provenance repository 110. The npm proxy also invokes an npm install command to download the npm components from one or more secure repositories 114.

Further Examples

Figure 3:
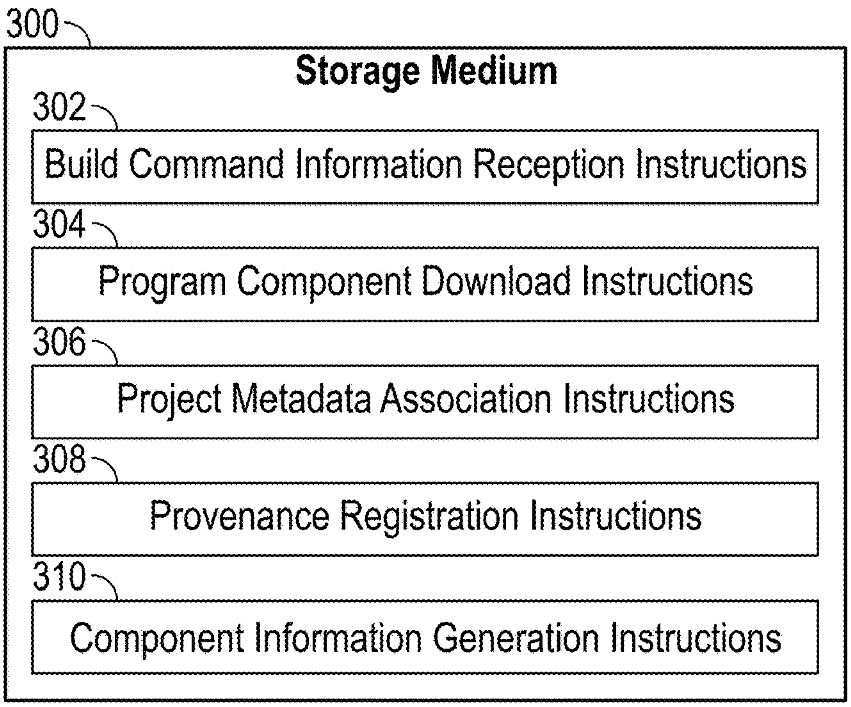
FIG. 3 is a block diagram of a storage medium storing machine-readable instructions according to some examples.

FIG. 3 is a block diagram of a non-transitory machine-readable or computer-readable storage medium 300 storing machine-readable instructions according to some examples of the present disclosure. The machine-readable instructions upon execution cause a system to perform various tasks. The system can include one or more computers.

The machine-readable instructions include build command information reception instructions 302 to receive, at a proxy, build command information from a build tool. An example of the proxy is the deliverable build proxy 104 of FIG. 1. In some examples, the proxy can be part of a collection of proxies for respective different types of build tools. The build command information from the build tool can include one or more build commands for building a deliverable.

The machine-readable instructions include program component download instructions 304 to, based on the build command information, obtain, by the proxy, program components from one or more program repositories for building the deliverable with the build tool. Examples of program repositories include the secure repositories 114 of FIG. 1.

The machine-readable instructions include project metadata association instructions 306 to associate, by the proxy, project metadata with the build command information, the project metadata relating to a project associated with building the deliverable including the program components. In some examples, the association of the project metadata with the build command information is based on receipt, by the proxy, of a proxy command from the build tool, where the proxy command includes the build command(s) wrapped by wrapping information including the project metadata. In other examples, the association of the project metadata with the build command information includes parsing, by the proxy, a data structure (e.g., build information such as a build file) of the build tool to identify the build command information; and associating, by the proxy, the project metadata with the build command information based on the parsing of the data structure of the build tool.

The machine-readable instructions include provenance registration instructions 308 to initiate, by the proxy, a registration of the program components with the project metadata in a provenance repository. In some examples, the proxy interacts with a metadata management engine (e.g., 106 in FIG. 1) to perform the registration.

The machine-readable instructions include component information generation instructions 310 to generate, using the provenance repository, component information identifying the program components that are part of the deliverable. An example of the component information includes a SBOM.

In some examples, the machine-readable instructions perform policy-based onboarding of the program components from one or more sources (e.g., 116 in FIG. 1) to the one or more program repositories.

In some examples, the policy-based onboarding is based on policy information specifying information (e.g., location information) of the one or more sources and a validation requirement for the program components.

In some examples, the machine-readable instructions validate the program components according to the validation requirement specified by the policy information as the program components are retrieved from the one or more sources into the one or more program repositories.

In some examples, the registration of the program components with the project metadata in the provenance repository includes adding identifiers of the program components and results of the validating of the program components when retrieved from the one or more sources into the one or more program repositories.

In some examples, access of the one or more program repositories is secured based on verification of information (e.g., trusted network address) of the build tool. This verification is part of an access control of the program repositories.

In some examples, the proxy provides the project metadata to the metadata management engine, and the metadata management service adds the project metadata with information of the program components in the provenance repository.

In some examples, the project metadata includes a unique project identifier for the project, and the registration of the program components associates the project identifier with information of the program components in the provenance repository.

In some examples, the project metadata includes a list of the program components for the deliverable, and the registration of the program components associates, based on the list, the project identifier with the information of the program components in the provenance repository.

In some examples, the provenance repository includes entries mapping project metadata of different projects with respective collections of program components.

Figure 4:
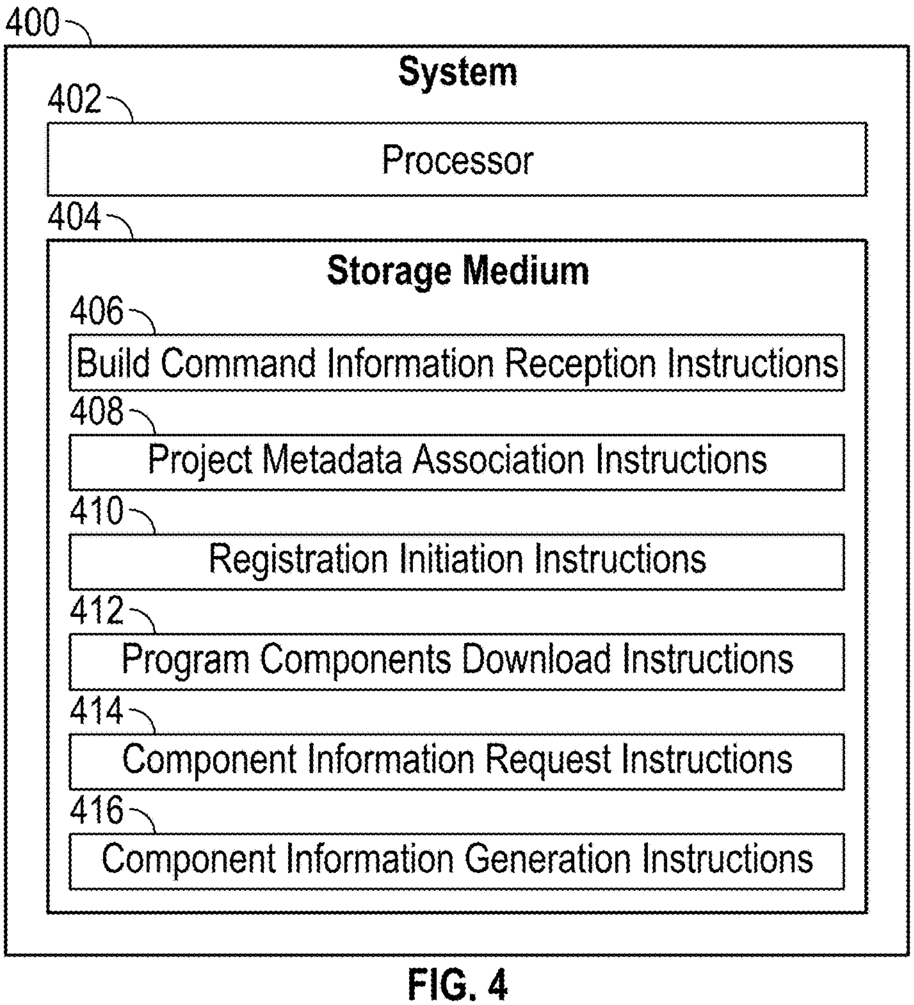
FIG. 4 is a block diagram of a system according to some examples.

FIG. 4 is a block diagram of a system 400 according to some examples of the present disclosure. The system 400 includes a processor 402 (or multiple processors). A processor can include a microprocessor, a core of a multi-core microprocessor, a microcontroller, a programmable integrated circuit, a programmable gate array, or another hardware processing circuit.

The system 400 includes a storage medium 404 storing machine-readable instructions executable on the processor 402 to perform various tasks. Machine-readable instructions executable on a processor can refer to the instructions executable on a single processor or the instructions executable on multiple processors.

The machine-readable instructions in the storage medium 404 include build command information reception instructions 406 to receive, at a proxy, build command information from a build tool. The build command information includes a build command for building a deliverable.

The machine-readable instructions in the storage medium 404 include project metadata association instructions 408 to associate, by the proxy, project metadata with the build command information. The project metadata relates to a project associated with building the deliverable including program components.

The machine-readable instructions in the storage medium 404 include registration initiation instructions 410 to initiate, by the proxy, a registration of the program components with the project metadata in a provenance repository. The initiation of the registration is in response to the build command information and the project metadata.

The machine-readable instructions in the storage medium 404 include program components download instructions 412 to, based on the build command, obtain, by the proxy, the program components from one or more program repositories for building the deliverable.

The machine-readable instructions in the storage medium 404 include component information request reception instructions 414 to receive a request to build component information for the deliverable, where the request includes project information that is part of the project metadata. The component information can include a SBOM.

The machine-readable instructions in the storage medium 404 include component information generation instructions 416 to, responsive to the request, perform a lookup of the provenance repository using the project information, and generate, based on the lookup of the provenance repository, component information identifying the program components that are part of the deliverable.

Figure 5:
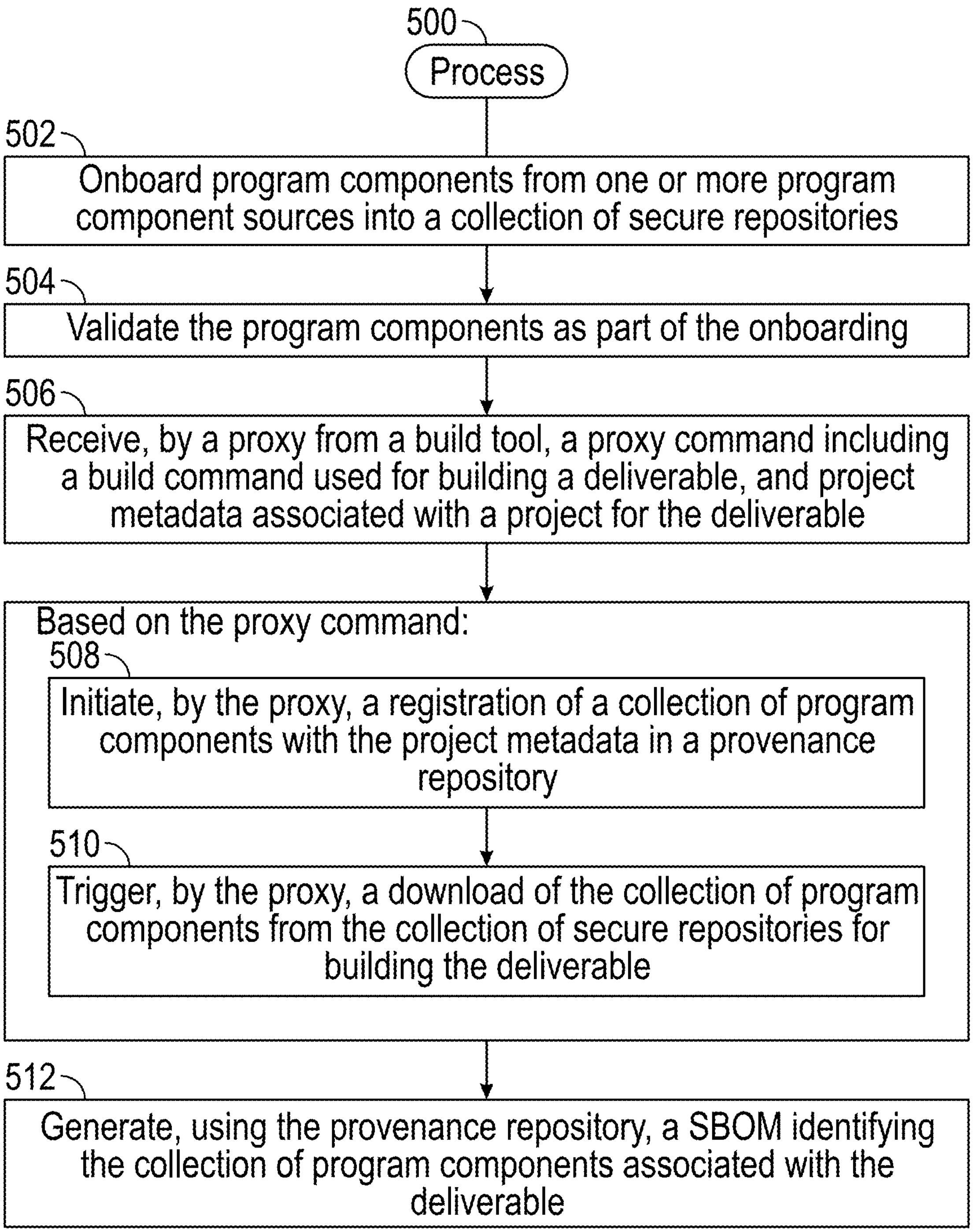
FIG. 5 is a flow diagram of a process according to some examples.

FIG. 5 is a flow diagram of a process 500 according to some examples. The process 500 can be performed by a system including one or more computers. For example, the system can include the deliverable build proxy 104, the metadata management engine 106, the SBOM generation engine 108, and the secure repository management engine 112 of FIG. 1.

The process 500 includes onboarding (at 502) program components from one or more program component sources into a collection of secure repositories. The collection of secure repositories can include a single secure repository or multiple secure repositories. A secure repository is subject to access control to manage which clients are authorized to access the secure repository.

The process 500 includes validating (at 504) the program components as part of the onboarding. The validating can be based on validation policy, which can specify one or more of the following types of validations: malware scanning of a program component, an integrity check of a program component, or another validation check.

The process 500 includes receiving (at 506), by a proxy from a build tool, a proxy command including a build command used for building a deliverable, and project metadata associated with a project for the deliverable. The build command may be wrapped by wrapping information including the project metadata in the proxy command.

Based on the proxy command, the process 500 includes initiating (at 508), by the proxy, a registration of a collection of program components with the project metadata in a provenance repository, and triggering (at 510), by the proxy, a download of the collection of program components from the collection of secure repositories for building the deliverable.

The process 500 includes generating (at 512), using the provenance repository, a SBOM identifying the collection of program components associated with the deliverable. The generation of the SBOM can be in response to a SBOM request that includes project information, which can include information that is part of the project metadata.

In some examples, the registration of the collection of program components with the project metadata in the provenance repository includes adding validation results produced by the validating of the project components in the collection of program components.

An "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

parse, by a proxy, a data structure of a build tool to identify build command information of the build tool;

based on the build command information, obtain, by the proxy, program components from one or more program repositories for building a deliverable with the build tool;

associate, by the proxy based on the parsing of the data structure of the build tool, project metadata with the build command information, the project metadata relating to a project associated with building the deliverable comprising the program components;

initiate, by the proxy, a registration of the program components with the project metadata in a provenance repository; and generate, using the provenance repository, component information identifying the program components that are part of the deliverable.

2. The non-transitory machine-readable storage medium of claim 1, wherein the instructions upon execution cause the system to:

perform policy-based onboarding of the program components from one or more sources to the one or more program repositories.

3. The non-transitory machine-readable storage medium of claim 2, wherein the policy-based onboarding is based on policy information specifying information of the one or more sources and a validation requirement for the program components.

4. The non-transitory machine-readable storage medium of claim 3, wherein the instructions upon execution cause the system to:

validate the program components according to the validation requirement specified by the policy information as the program components are retrieved from the one or more sources into the one or more program repositories.

5. The non-transitory machine-readable storage medium of claim 4, wherein the registration of the program components with the project metadata in the provenance repository comprises adding identifiers of the program components and results of the validating of the program components when retrieved from the one or more sources into the one or more program repositories.

6. The non-transitory machine-readable storage medium of claim 4, wherein the one or more sources comprise a source accessible over a public network.

7. The non-transitory machine-readable storage medium of claim 1, wherein access of the one or more program repositories is secured based on verification of information of the build tool.

8. The non-transitory machine-readable storage medium of claim 1, wherein the proxy registers the program components with the project metadata in the provenance repository by interfacing with a metadata management engine.

9. The non-transitory machine-readable storage medium of claim 8, wherein the proxy provides the project metadata to the metadata management engine, and the instructions upon execution cause the system to:

add, by the metadata management engine, the project metadata with information of the program components in the provenance repository.

10. The non-transitory machine-readable storage medium of claim 1, wherein the project metadata comprises a project identifier for the project, and the registration of the program components associates the project identifier with information of the program components in the provenance repository.

11. The non-transitory machine-readable storage medium of claim 10, wherein the project metadata comprises a list of the program components for the deliverable, and the registration of the program components associates, based on the list, the project identifier with the information of the program components in the provenance repository.

12. The non-transitory machine-readable storage medium of claim 1, wherein the provenance repository comprises entries mapping project metadata of different projects with respective collections of program components.

13. The non-transitory machine-readable storage medium of claim 1, wherein the generated component information comprises a software bill of materials (SBOM).

14. A system comprising:

a processor; and a non-transitory storage medium storing instructions executable on the processor to:

receive, at a proxy, build command information from a build tool, the build command information comprising a build command wrapped, by the build tool, with wrapping information including project metadata, the build command for building a deliverable;

associate, by the proxy based on the wrapping information, the project metadata with the build command information, the project metadata relating to a project associated with building the deliverable comprising program components;

initiate, by the proxy, a registration of the program components with the project metadata in a provenance repository;

based on the build command, obtain, by the proxy, the program components from one or more program repositories for building the deliverable;

receive a request to build component information for the deliverable, wherein the request comprises project information that is part of the project metadata; and responsive to the request, perform a lookup of the provenance repository using the project information, and generate, based on the lookup of the provenance repository, component information identifying the program components that are part of the deliverable.

15. The system of claim 14, wherein access of the one or more program repositories is subject to access control, and the program components are validated as the program components are onboarded to the one or more program repositories from program component sources.

16. The system of claim 15, wherein the registration of the program components with the project metadata in the provenance repository comprises adding validation results produced by the validation of the program components.

17. The system of claim 14, wherein the project metadata comprises a project identifier for the project, and a list of the program components for the deliverable, and the registration of the program components associates the project identifier with information of the program components in the list.

18. A method comprising:

receiving, by a proxy from a build tool, a proxy command comprising a build command wrapped, by the build tool, with wrapping information including project metadata, the build command used for building a deliverable, and the proxy executed by a system comprising a hardware processor;

based on the proxy command, obtaining, by the proxy, program components from one or more program repositories for building the deliverable with the build tool;

associating, by the proxy based on the wrapping information, the project metadata with the build command, the project metadata relating to a project associated with building the deliverable comprising the program components;

initiating, by the proxy, a registration of the program components with the project metadata in a provenance repository;

generating, using the provenance repository, a software bill of materials (SBOM) identifying the collection of program components associated with the deliverable.

19. The method of claim 18, further comprising:

onboarding, by the system, the program components from one or more program component sources into the one or more program repositories;

validating, by the system, the program components as part of the onboarding, wherein the registration of the of program components with the project metadata in the provenance repository comprises adding validation results produced by the validation of the program components.

20. The method of claim 18, wherein the project metadata comprises a project identifier for the project, and a list of the program components for the deliverable, and the registration of the program components associates the project identifier with information of the program components in the list.

* * * * *